United States Patent
Jahnz et al.

(10) Patent No.: US 8,128,865 B2
(45) Date of Patent: Mar. 6, 2012

(54) PROCESS OF MAKING A SHROUDED IMPELLER

(75) Inventors: David Brian Jahnz, San Diego, CA (US); Jess Lee Freeman, Poway, CA (US)

(73) Assignee: Solar Turbines Inc., San Diego, CA (US)

( * ) Notice: Subject to any disclaimer, the term of this patent is extended or adjusted under 35 U.S.C. 154(b) by 1161 days.

(21) Appl. No.: 11/980,464

(22) Filed: Oct. 31, 2007

(65) Prior Publication Data

US 2009/0110556 A1    Apr. 30, 2009

(51) Int. Cl.
*B22F 5/00* (2006.01)
*B22F 3/15* (2006.01)
*F01D 5/22* (2006.01)
*F04D 29/28* (2006.01)

(52) U.S. Cl. .............. 419/5; 419/28; 419/49; 416/186 R
(58) Field of Classification Search .............. 416/186 R; 419/5, 6, 28, 49
See application file for complete search history.

(56) References Cited

U.S. PATENT DOCUMENTS

| | | | |
|---|---|---|---|
| 4,063,939 A * | 12/1977 | Weaver et al. | 419/5 |
| 4,076,179 A * | 2/1978 | Tsukube | 241/46.11 |
| 4,445,259 A | 5/1984 | Ekbom | |
| 4,581,300 A | 4/1986 | Hoppin, III et al. | |
| 4,883,639 A * | 11/1989 | Adlerborn et al. | 419/49 |
| 5,057,340 A | 10/1991 | Iyer et al. | |
| 5,080,843 A | 1/1992 | Larker et al. | |
| 5,113,583 A | 5/1992 | Jenkel et al. | |
| 5,403,165 A | 4/1995 | Lehe et al. | |
| 5,438,755 A | 8/1995 | Giberson | |
| 5,593,085 A | 1/1997 | Tohill et al. | |
| 2006/0026833 A1 | 2/2006 | Imbourg et al. | |
| 2006/0078455 A1 | 4/2006 | Troitski et al. | |

OTHER PUBLICATIONS

R. Baccino et al. High performance and high complexity net shape parts for gas turbines: the ISOPREC powder metallurgy process, Materials and Design, vol. 21, (2000), pp. 345-350.*

* cited by examiner

*Primary Examiner* — George Wyszomierski
*Assistant Examiner* — Mark L Shevin
(74) *Attorney, Agent, or Firm* — Finnegan, Henderson, Farabow, Garrett & Dunner LLP (57) ABSTRACT

A method of fabricating a shrouded impeller is disclosed. The method includes providing an open faced impeller, the open faced impeller including a plurality of blades extending at least partially radially from a hub. The method also includes performing a first powder metallurgical process to form a first material over at least part of the open faced impeller. The method further includes forming a shroud circumferentially disposed about the hub and connected to one of more of the blades. Forming the shroud includes performing a second powder metallurgical process to metallurgically bond the shroud to at least some of the blades.

18 Claims, 6 Drawing Sheets

PROCESS OF MAKING A SHROUDED IMPELLER

TECHNICAL FIELD

The present disclosure relates to a process of making a shrouded impeller.

BACKGROUND

Impellers are rotating components of a turbo machine that impart energy to, or harness energy from, a stream of fluid directed through the machine. For instance, an impeller used in a gas compressor may impart energy to a flow of air flowing through the impeller, and an impeller used in the turbine section may rotate a shaft connected thereto, due to the kinetic energy of hot gases passing over the impeller. These hot gases may be produced by combusting a hydrocarbon based fuel in a combustion chamber of the turbine engine. "Open faced impellers" may have a hub with a plurality of protruding blades. The shape of the blades may be configured to direct a flow of fluid between them. The hub may include a passageway for passing a drive shaft through. In some applications, a shrouded impeller may be preferred to an open faced impeller described above. A shrouded impeller is an open faced impeller with a circumferential shroud connecting the outer ends of the blades to define a cavity through which a flow of fluid is directed.

Conventional methods of construction of shrouded impellers include casting and machining. In a method involving casting, a shrouded impeller may, for example, be cast in a mold and finished by polishing to a required surface finish. In a method involving machining, the shrouded impeller may be created using any conventional machining operation. Shrouded impellers may also be formed from pre-fabricated open faced impellers. In this process, an open faced impeller formed by conventional forging, casting, or machining techniques, may be joined (welded, brazed, etc.) with a separately fabricated shroud. In such a construction, the joints connecting the shroud to the open faced impeller may be subject to failure due to the stresses induced during operation. To prevent these potential failures, shrouded impellers of a unitary construction have been created by machining.

U.S. Pat. No. 5,438,755 issued to Gilberson ('755 patent) describes a method of making a shrouded impeller of a unitary construction using three-dimensional CNC milling. The method of the '755 patent involves fabricating a shrouded impeller from a single blank using four machining steps. These steps include: turning and boring a rough forging to an impeller profile; removing material from the passageways of the impeller using a three-dimensional CNC milling machine; removing material in direct line of sight from the outside diameter of the impeller; and forming a hole through a central zone of each impeller passageway by three dimensional planning. Although the method of fabrication described in the '755 patent produces shrouded impellers of unitary construction, the method of the '755 patent may have drawbacks. For instance, machining blades and passageways in the presence of the shroud may be difficult or not possible, and therefore, expensive. The present disclosure is directed to solving one or more of the problems set forth above.

SUMMARY

In one aspect, a method of fabricating a shrouded impeller is disclosed. The method includes providing an open faced impeller, the open faced impeller including a plurality of blades extending at least partially radially from a hub. The method also includes performing a first powder metallurgical process to form a first material over at least part of the open faced impeller. The method further includes forming a shroud circumferentially disposed about the hub and connected to one of more of the blades. Forming the shroud includes performing a second powder metallurgical process to metallurgically bond the shroud to at least some of the blades.

In another aspect, a method of forming a bridge over a pair of blades is disclosed. The method includes obtaining a component having a pair of blades separated by a gap. The pair of blades being coupled at a first end and uncoupled at a second end opposite the first end. The method also includes filling the gap between the pair of blades using a first powder, and compacting the first powder to form a first material. The first material includes a first surface in a gap between the pair of blades. The method also includes depositing a second powder on the first surface, and compacting the second powder to form a second material on the first surface. The second material forming a metallurgical bond with the second end of the pair of blades. The method further includes removing the first material to form the bridge of second material connecting the second end of the pair of blades.

In yet another aspect, a shrouded impeller is disclosed. The shrouded impeller includes a hub having an annular external surface disposed about a longitudinal axis, and a plurality of blades extending at least partially radially outwards from the external surface. The shrouded impeller also includes a shroud circumferentially disposed about the longitudinal axis and metallurgically bonded to at least some of the blades by a hot isostatic pressing process.

DETAILED DESCRIPTION

Figure 1:
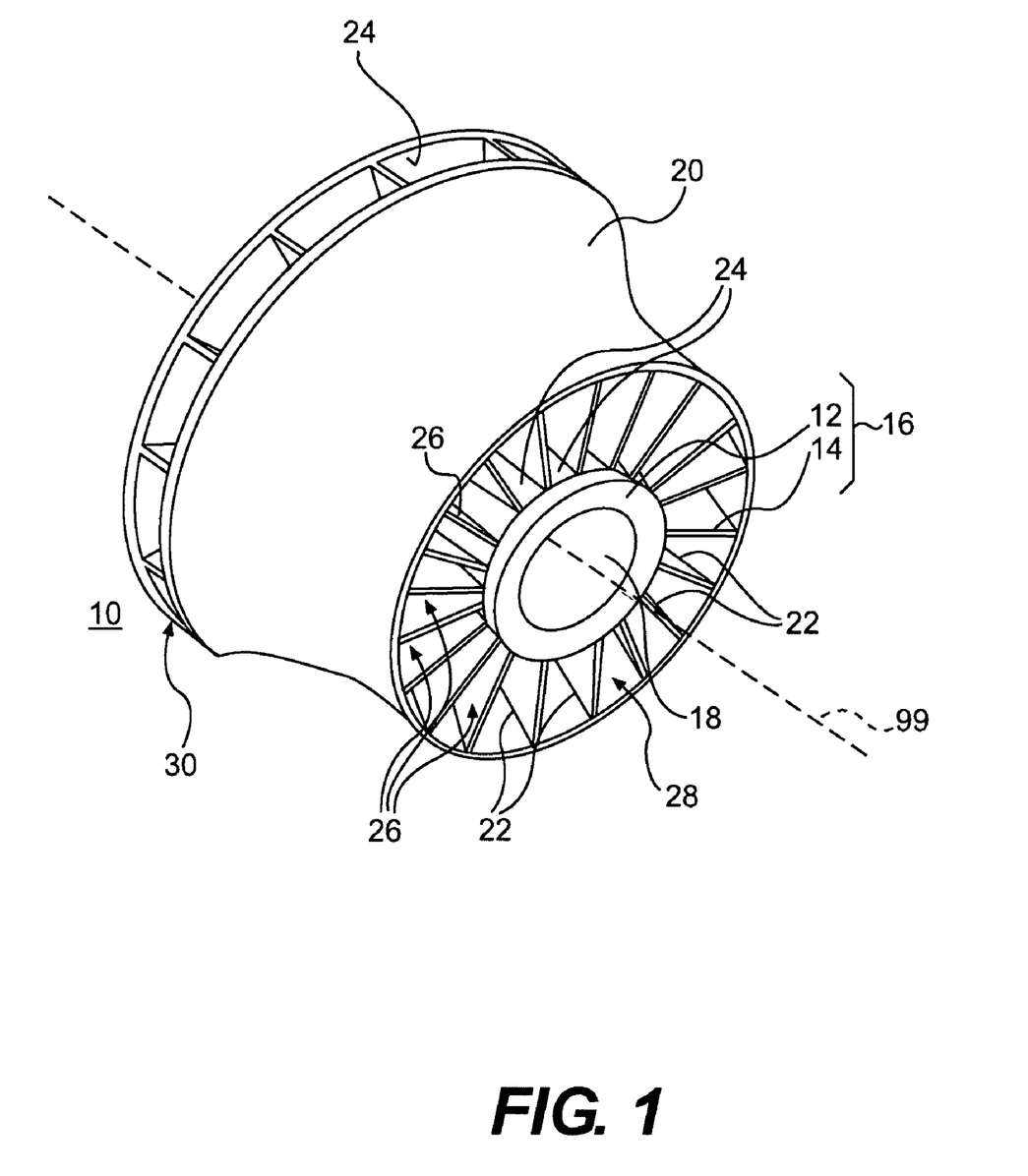
FIG. 1 is an illustration of an exemplary shrouded impeller.

FIG. 1 illustrates an exemplary shrouded impeller 10. Shrouded impeller 10 may include an open faced impeller 16 with a shroud 20 connected thereto. Open faced impeller 16 may include a hub 12 with a plurality of blades 14 formed on an external surface 24 thereof. Blades 14 may define a plurality of passageways 26 therebetween. External surface 24 may be circumferentially disposed about longitudinal axis 99 and have a shape configured to direct a flow of air in a desired manner. In some embodiments, the shape of external surface 24 may generally resemble a frustum of a cone. In the embodiment of shrouded impeller 10 illustrated in FIG. 1, external surface 24 may be curved along a direction of longitudinal axis 99. The shape of blades 14 may also be configured to direct a flow of air in a desired manner. Blades 14 may extend along a length of external surface 24. Blades 14 may also be curved along a direction of longitudinal axis 99. In some embodiments, blades 14 may only extend partway along the length of external surface 24. Each blade 14 may protrude in a direction normal to external surface 24 to a tip 22. In some embodiments, blades 14 may also be curved in a direction normal external surface 24. Tip 22 may include an edge of blade 14 opposite external surface 24. The tips 22 of blades 14 may be joined together by shroud 20. It is contemplated that in some embodiments, tips 22 of some blades 14 may not be joined by shroud 20.

Shroud 20 may be an annular component disposed about longitudinal axis 99 connecting tips 22 of blades 14 together. Shroud 20 may be metallurgically bonded to tips 22 of blades 14. Shroud 20 may be shaped to match an external profile of tips 22. External profile of tips 22 is the profile of an imaginary surface that passes through tips 22 of blades 14. In the embodiment shown in FIG. 1, shroud 20 is depicted to have a shape generally resembling a frustum of a cone with an outer surface extending around, and curved along, longitudinal axis 99. However, shroud 20 can have any general shape. Shroud 20 may enclose an annular cavity between shroud 20 and hub 12. The cavity may have an opening 28 oriented along a direction of longitudinal axis 99, and an opening 30 oriented in a direction normal to longitudinal axis 99. Both openings 28 and 30 may extend around longitudinal axis 99. The cavity may be divided into the plurality of passageways 26 by blades 14. Each passageway 26 may be bounded by blades 14, external surface 24, and shroud 20. Air may enter the cavity between hub 12 and shroud 20 opening 28, flow through passageways 26, and exit through opening 30. It is also contemplated that air may enter passageways 26 through opening 30 and exit through opening 28. Hub 12 may also include a through-hole 18 passing longitudinally therethrough. Through-hole 18 may be centrally located on hub 12 and extend concentric with longitudinal axis 99.

Open faced impeller 16, in general, may be made of any material known in the art. In some embodiments, open faced impeller 16 may be made of a stainless steel alloy, such as 15-5 PH stainless steel alloy. In some embodiments, both hub 12 and blades 14 of open faced impeller 16 may be made of the same material. However, hub 12 may be made of a different material than blades 14. Shroud 20 may also be made of any material. In some embodiments, shroud 20 and open faced impeller 16 may be made of the same material, such as 15-5 PH stainless steel alloy.

Figure 2A:
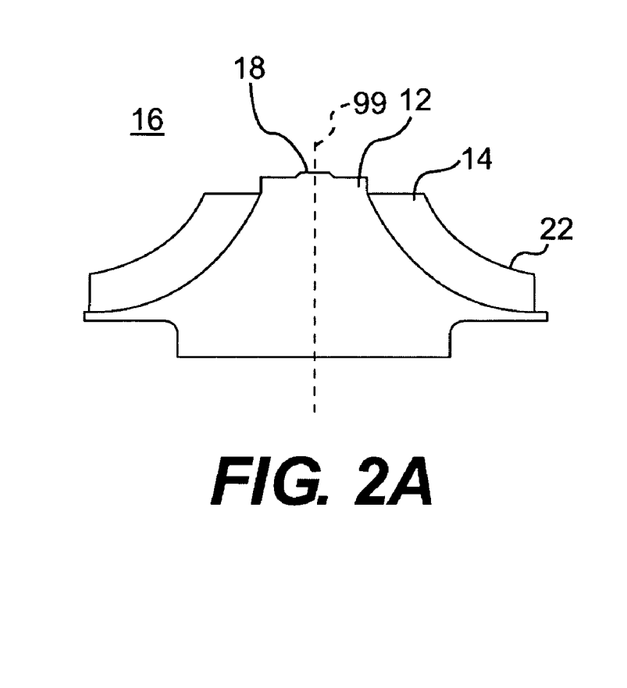
FIG. 2A-2F are sequential schematic illustrations of a method of forming a shroud on an open faced impeller.

FIGS. 2A-2F illustrate an exemplary method of making shrouded impeller 10. FIG. 2A illustrates an open faced impeller 16 constructed without shroud 20. Any means known in the art may be used to construct open faced impeller 16. Open faced impeller 16 may include blades 14 formed on hub 12. In some embodiments, blades 14 and hub 12 of open faced impeller 16 may be formed as one piece. In other embodiments, blades 14 and hub 12 may be constructed separately and then joined. In some embodiments, open faced impeller 16 may be cast from a melt or pressed into shape using a forging operation, while in other embodiments, open faced impeller 16 may be machined from a blank. It is also contemplated that open faced impeller 16 may be formed by a powder metallurgy process. For instance, open faced impeller 16 may be formed by a pressing a metal powder into shape using a tool or other known process, such as Hot Isostatic Pressing (HIP).

Figure 2B:
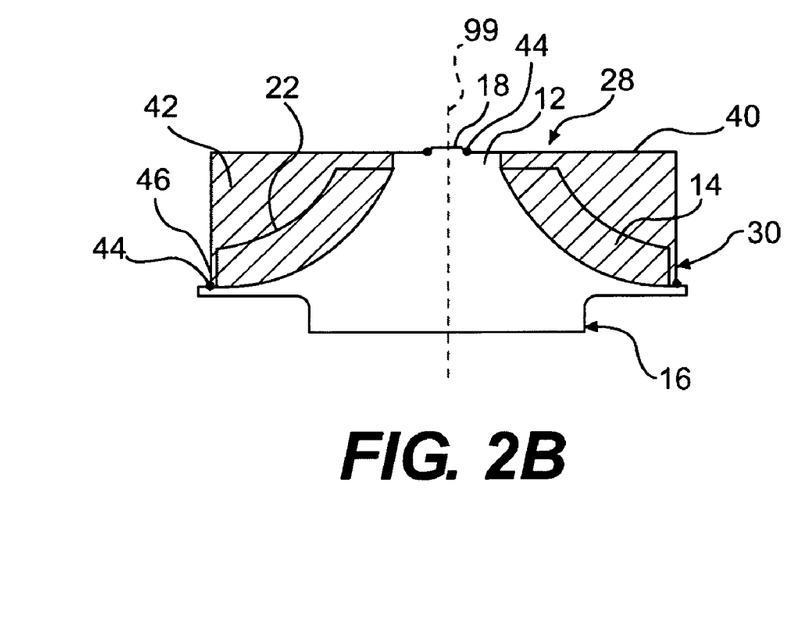

A first can 40 containing a first powder 42 may be placed over blades 14 of open faced impeller 16 such that the first powder 42 flows into passageways 26 between blades 14 forming a layer over tip 22, opening 28, and opening 30. FIG. 2B illustrates first can 40 with first powder 42 placed over open faced impeller 16. First can 40 may be made of a material suitable for a powder metallurgical process, such as a HIP process. In some embodiments, first can 40 may be made of a malleable material. It is also contemplated that first can 40 may be made of a material that is brittle at room temperature but malleable at a high temperature. First powder 42 may include any powder material, such as carbon steel powder, that can be hardened to a first material 42A by a powder metallurgical process (such as, for example a HIP process) and readily removed by mechanical or chemical means such as leaching. Excess amount of first powder 42 may overflow from first can 40 such that the first powder 42 between first can 40 and open faced impeller 16 takes up substantially all the space between first can 40 and open faced impeller 16. In some embodiments, open faced impeller 16 with first can 40 and first powder 42 disposed over it may be subjected to vacuum to remove air and moisture from first powder 42. Edges of first can 40 may be sealed using seals 44 to ensure that first powder 42, enclosed by first can 40 and open faced impeller 16 does not leak out. Seal 44 may also prevent air and moisture from leaking into first can 40. Seal 44 may be formed by various materials and processes known in the art. Non-limiting examples of forming seal 44 may include welding, brazing, gluing, etc. Seals 44 may be formed between first can 40 and open faced impeller 16 at the periphery of through-hole 18, and at open edge 46 of first can 40. It is contemplated that, in some embodiments, seals 44 may be formed at other locations.

After formation of seals 44, open faced impeller 16, with first can 40 containing first powder 42 disposed over it, may be subjected to a first powder metallurgical process, such as a first HIP process. First HIP process may include any HIP process known in the art. In an exemplary first HIP process, open faced impeller 16, with first can 40 containing first powder 42 disposed over it, may be subjected to a combination of a high temperature and high pressure gas. The high temperature may be selected such that first powder 42 yields and creeps in compression under the action of the applied pressure to form a first material 42A. The first HIP process may result in elimination of voids within first material 42A and densification and hardening of first material 42. Densification and hardening of first material 42A may occur by the formation of a metallurgical bond between individual particles of first powder 42. First HIP process may also form a bond at the interface between first material 42A and first can 40, and at the interface between first material 42A and open faced impeller 16.

Figure 2C:
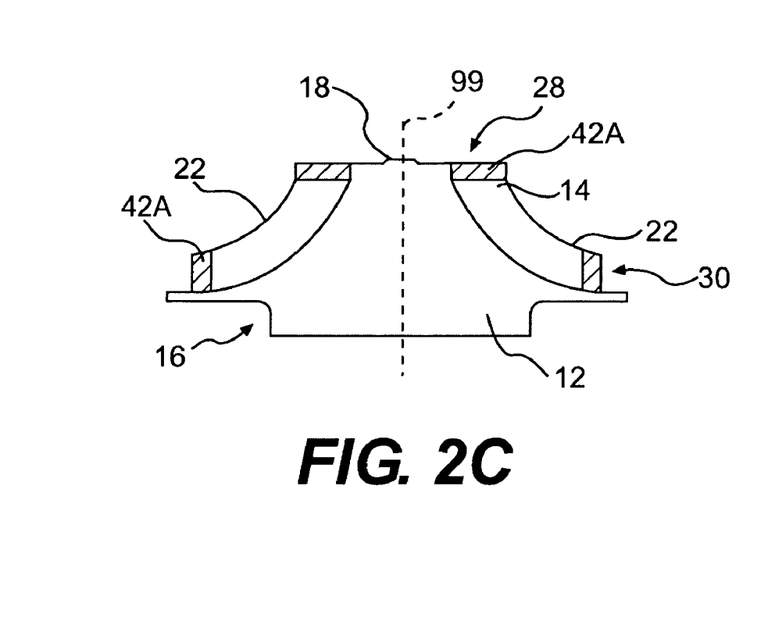

After hardening of first material 42A in passageways 26 of open faced impeller 16, a machining process may be carried out to machine external surfaces of open faced impeller 16. FIG. 2C is an illustration of open faced impeller 16 after the machining process. The machining process may remove first can 40 and first material 42A from an outside surface of open faced impeller 16. Any machining process known in the art may be used to machine first can 40 and first material 42A. In some embodiments, first can 40 may be first removed by a chemical or a mechanical process before a machining process is used to machine exposed surfaces of first material 42A. The machining operation may also remove material from external surfaces of blade 14 and hub 12. After the machining operation, the external profile of tips 22 may correspond to a profile of shroud 20 and passageways 26 may be filled with first material 42A. After the machining operation, first material 42A may also fill a region of open faced impeller 16 proximate openings 28 and 30.

Figure 2D:
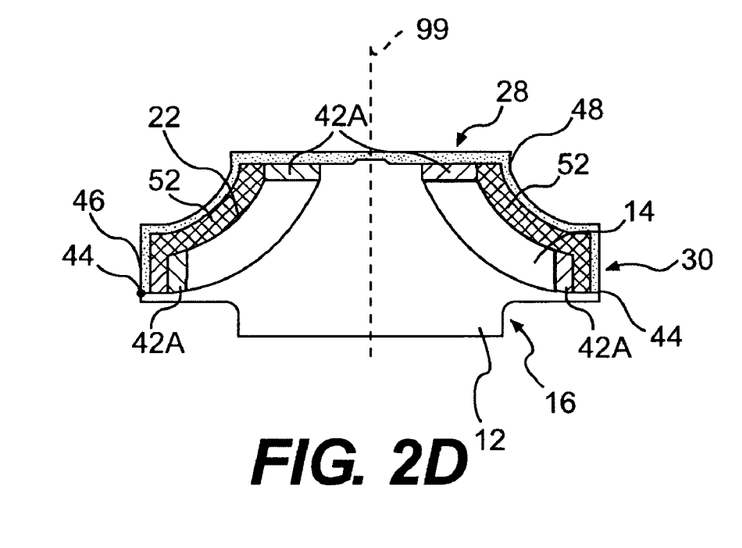

As shown in FIG. 2D, after removal of first can 40 and first material 42A from external surfaces of open faced impeller 16, a second can 48 containing a second powder 52 may be placed over open faced impeller 16 with remaining first material 42A. Second can 48 may be made of various malleable materials known in the art. In some embodiments, second can 48 may be made of the same material as first can 40. Second powder 52 may include any powder material, such as 15-5 PH stainless steel alloy powder, that can be hardened to a second material 52A by a powder metallurgical process (such as, for example a HIP process). In some embodiments, second powder 52 may include a mixture of various powder materials that may be hardened to form a second material 52A using a powder metallurgical process. In some embodiments, second powder 52 may include a powder of the material forming blades 14.

The profile of second can 48 may extend in close parallel relation to the profile of an outer surface of open faced impeller 16 with the remaining first material 42A, such that second can 48 may snugly fit on the outer surface. In this configuration, second powder 52 may form an annular layer between the external profile of tips 22 and second can 48. First material 42A in passageways 26 may prevent second powder 52 from entering passageways 26 between the blades 14. Open edge 46 of second can 48 may now be sealed using a seal 44 to ensure that second powder 52 is securely contained within second can 48, and to prevent air and moisture from leaking into second can 48. In some embodiments, the assembly may be subjected to a vacuum to remove air and moisture from second powder 52 prior to sealing.

After formation of seals 44, the assembly may be subjected to a second powder metallurgical process, such as a second HIP process. The second HIP process may include any HIP process known in the art. In some embodiments, second HIP process may be substantially identical to the first HIP process, while in other embodiments, the second HIP process may be performed at temperature and pressure conditions different from the first HIP process. The second HIP process may result in densification and hardening of second powder 52 to form second material 52A. The second HIP process may also form a metallurgical bond between blades 14 and second material 52A. These metallurgical bonds may form a seamless and substantially continuous interconnection between second material 52A and tips 22 of blades 14.

In this disclosure, metallurgical bonding is defined as the uniting or fusing together of interfacing surfaces (such as interfacing surfaces of tips 22 and second material 52A) such that material at the interfacing surfaces blend or flow together to form a continuous metallic zone interconnecting the two parts. In cases of interfacing surfaces of different materials, metallurgical bonding may also include alloying, chemical bonding or diffusional interaction between the interfacing surfaces. In contradistinction to the interface of joined (welded, brazed, glued, etc.) components, the interface of metallurgically bonded components display a more continuous microstructure with decreased voids and discontinuities. In contradistinction to an interface of two regions of an integrally formed component (formed as one piece, such as by machining, casting as one piece, etc.), the interface of metallurgically bonded components display more discontinuities. Due to decrease in decrease in discontinuities at the interface, the mechanical strength of metallurgically bonded components may approach the mechanical strength of integrally formed components.

Figure 2E:
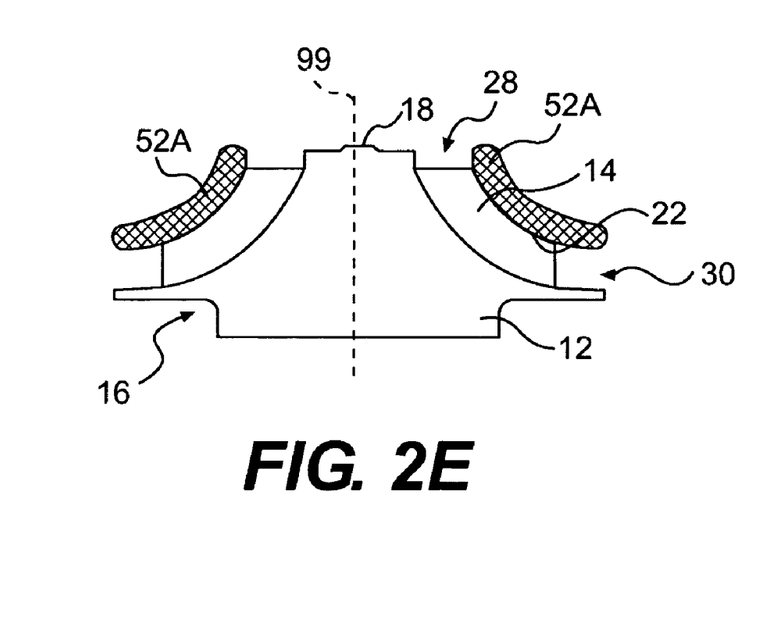

Second can 48 and first material 42A may now be removed from open faced impeller 16. FIG. 2E is an illustration of open faced impeller 16 with second can 48 and first material 42A removed. All of first material 42A, including first material 42A in passageways 26 between blades 14, may be removed from open faced impeller 16. Any means known in the art may be used to remove second can 48 and first material 42A. In some embodiments, both first material 42A and second can 48 may be removed by the same process, such as, for instance, leaching or etching using a chemical. The chemical used for the removal may depend on the material of second can 48 and first material 42A. In some cases an acid, such as, for example, nitric acid, may be used for leaching. In general, the removal of second can 48 and first material 42A may include separate operations. For instance, second can 48 may be removed by mechanical means, such as, for example using air blast or a water blast, and first material 42A may be removed by acid leaching. Any leaching technique known in the art may be employed for the removal of first material 42A. In some embodiments, the assembly may be agitated in an acid bath at a high temperature to remove first material 42A.

Figure 2F:
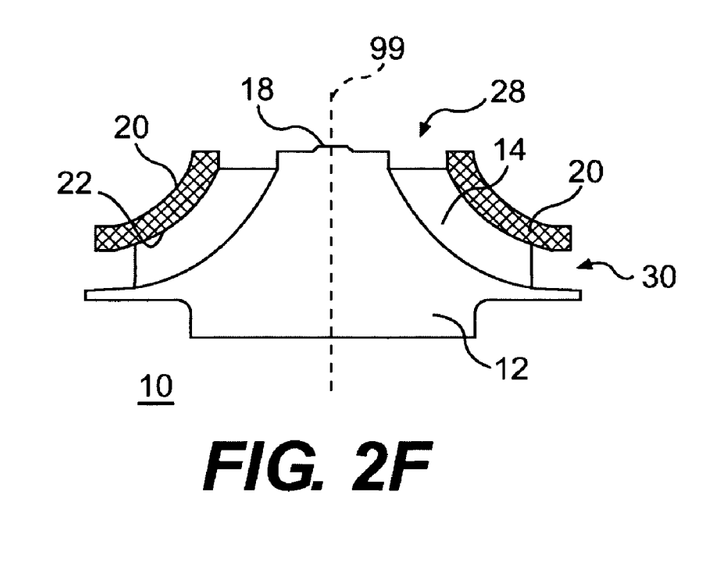

After removal of second can 48 and first material 42A, external surfaces of second material 52A may be machined to the desired dimensions to form shroud 20. FIG. 2F illustrates shrouded impeller 10 formed by machining shroud 20. Any machining process may be used to form shroud 20 from second material 52A. Open faced impeller 16 with shroud 20 connecting tips 22 of blades 14 forms shrouded impeller 10. The machining process may also include creating features on surface of shroud 20. In some embodiments, these machined features may be used to couple to mating features on other components. In some embodiments, the machining step may be eliminated if the dimensions of second material 52A match the desired dimensions of shroud 20.

Figure 3A:
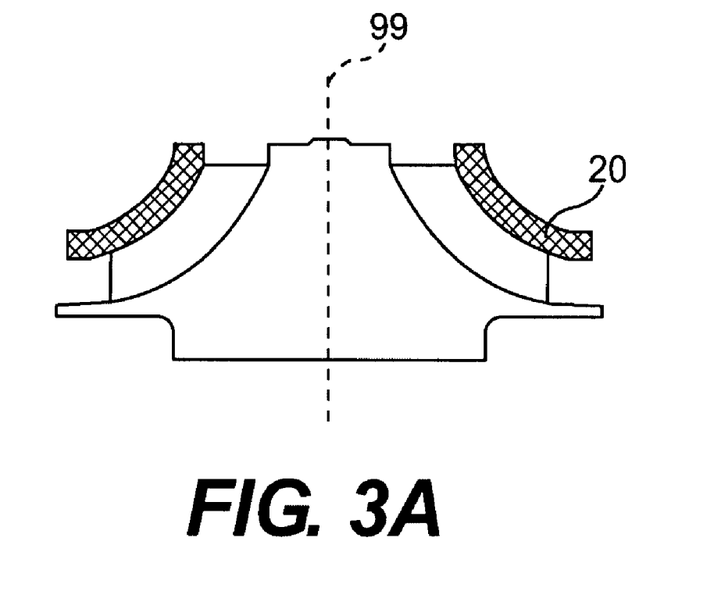
FIG. 3A is a schematic illustration of a pre-fabricated shroud.
Figure 3B:
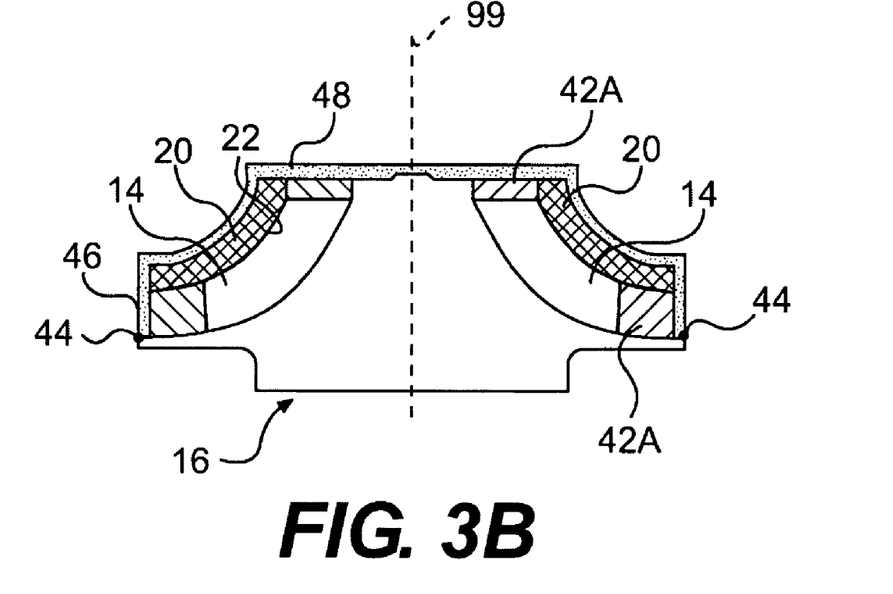
FIG. 3B is a schematic illustration of bonding the prefabricated shroud of FIG. 3A on the open faced impeller of FIG. 2C.
Figure 4:
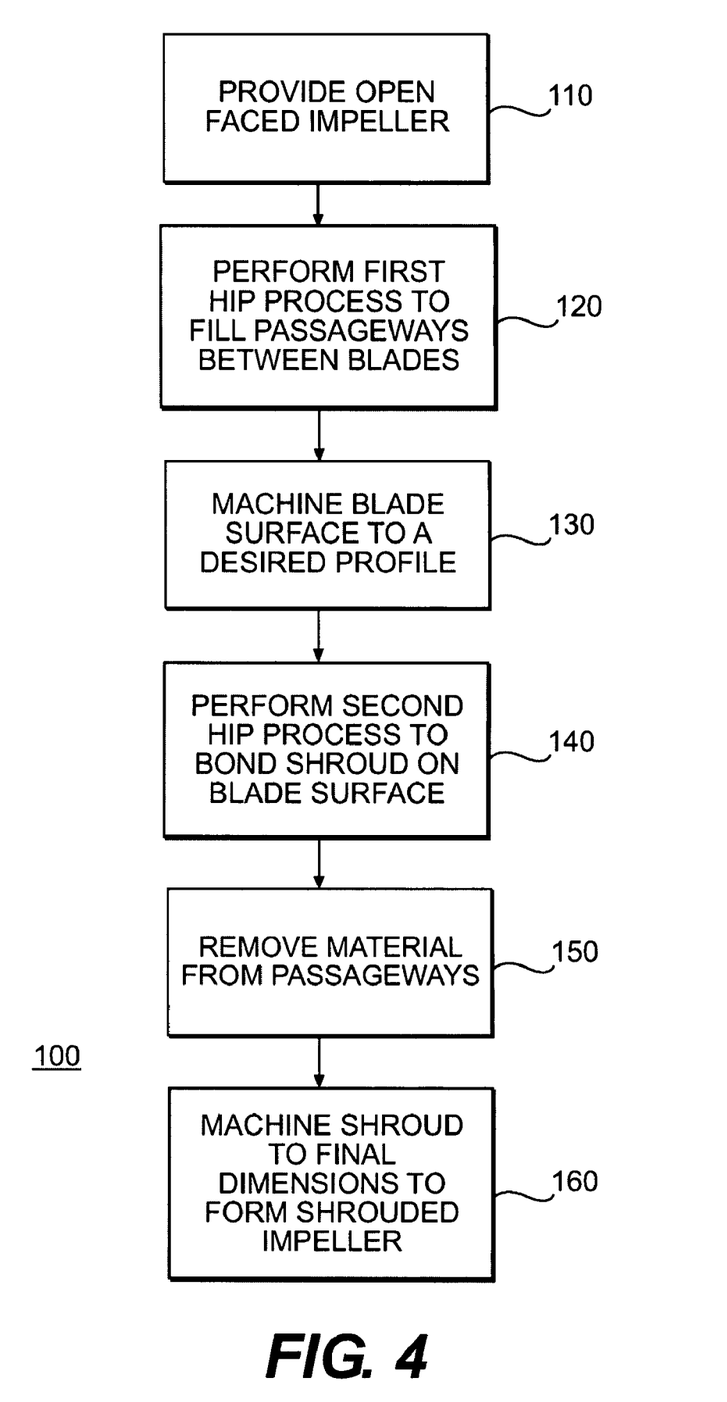
FIG. 4 is a flow chart illustrating an exemplary disclosed process for fabricating a shrouded impeller of FIG. 1.

In another embodiment of the method of making shrouded impeller 10, a pre-fabricated shroud may be metallurgically bonded to tips 22 of blades 14 after performing the first powder metallurgical process to fill passageways 26 with first material 42A. In such an embodiment, shroud 20 may be separately fabricated by machining from a forging, or by any other known process. FIG. 3A illustrates shroud 20 that is machined from a forging. The processes described earlier (illustrated in FIGS. 2A-2C) may be performed to fill passageways 26 with first material 42A, and conform the shape of an external surface of blades 14 to a profile of shroud 20 as illustrated in FIG. 2C. The pre-fabricated shroud 20 may then be placed over open faced impeller 16 and a second can 48 placed over shroud 20. FIG. 3B illustrates the open faced impeller 16 with prefabricated shroud 20 and second can 48 placed over the blades 14. Open edge 46 of second can 48 may also be sealed using seal 44, and a second power metallurgical process, such as a second HIP process may be carried out to metallurgically bond shroud 20 to tips 22 of blades 14. After metallurgically bonding shroud 20 to tips 22 of blades, second can 48 and first material 42A may be removed by the processes described earlier. In some embodiments, a machining process may also be conducted to machine shroud 20 to desired dimensions after bonding the pre-fabricated shroud 20 to open faced impeller 16.

INDUSTRIAL APPLICABILITY

The disclosed embodiments relate to a method of making a shrouded impeller in which the shroud is metallurgically bonded to the blades of an open faced impeller. Metallurgical bonding of the shroud to the blades allows a shrouded impeller, that has mechanical strength approaching that of an integrally formed shrouded impeller, to be constructed without the complexities involved in machining a shrouded impeller from one piece. Metallurgical bonding of the shroud to the blades improves the strength of the shrouded impeller by eliminating mechanical joints that attach the shroud to the blades. The method of making the shrouded impeller uses multiple powder metallurgical processes to form a shroud on an open faced impeller fabricated using a conventional process. A first powder metallurgical process fills the passageways between the blades to provide a continuous circumferential surface coincident with the tips of the blades on which a shroud may be formed. The second powder metallurgical process forms the shroud on this continuous surface. The material filling the passageways is then removed, and the shroud surface is machined to the final dimensions, to form the shrouded impeller. To illustrate the process of making the shrouded impeller, an exemplary embodiment will now be described.

FIG. 3 is a flow chart of an exemplary process 100 for fabricating shrouded impeller 10. An open faced impeller 16 is first provided (step 110). The providing of the open faced impeller 16 may include procuring a pre-fabricated open faced impeller 16. This step may also include fabrication of an open faced impeller 16 by any process known in the art. For instance, the open faced impeller 16 may be fabricated by forging, casting, machining, and/or powder metallurgical processes. The open faced impeller 16 may then be subject to a first HIP process (step 120) to fill passageways 26 between the blades 14 of the open faced impeller 16. The first HIP process may include placing a first can 40 containing a first powder 42 over open faced impeller 16 and allowing first powder 42 to fill passageways 26. The first can 40 may be sealed to the open faced impeller 16 and subject to a conventional HIP process to harden the first powder 42 to a first material 42A. An outer surface of the resulting first material 42A and blade tips 22 may then be machined (in step 130) to obtain a continuous circumferential surface connecting tips 22 on which shroud 20 may be formed. A second HIP process may then be performed to bond the shroud 20 on the open faced impeller 16 (step 140). The second HIP process may include placing a second can 48 containing a second powder 52 on the open faced impeller 16 with the first material 42A in passageways 26. The second powder 52 may form an annular layer over tips 22 of blades 14 and the first material 42A in passageways 26 between blades 14. A conventional HIP process may now be performed to harden the layer of second powder 52 to form second material 52A. Instead of hardening second powder 52 to second material 52A, in some embodiments, bonding shroud 20 on the open faced impeller (step 140) may include placing a pre-fabricated shroud 20 of the open faced impeller 16 and performing a second HIP process to metallurgically bond shroud 20 to tips 22 of open faced impeller 16. The first material 42A may then be removed from passageways 26 (step 150). In conjunction with removal of the first material 42A, second can 48 may also be removed. The removal of second can 48 and first material 42A may include one or more known mechanical, chemical, or chemically assisted mechanical steps. The shroud 20 may then be formed by machining second material 52A to desired final dimensions (step 160).

Shrouded impeller 10 formed by the described process 100 may have a unitary construction with an open faced impeller 16 metallurgically bonded to shroud 20. Metallurgically bonding shroud 20 to blades 14 may produce an interface with strength only minimally less than those provided by constructing a shrouded impeller from one piece, such as, by machining a shrouded impeller from a solid blank. Also, since the formation of shroud 20 occurs after the formation of passageways 26, the difficulties and related costs associated with machining a passageway 26 with a shroud 20 already present over the passageway 26 are eliminated.

It should be emphasized that although the disclosed processes are discussed in connection with forming a shroud on the tips of impeller blades, the disclosed processes may also be used to form other structures. For example, a bridge (or a shroud) may be formed over any component having two or more protrusions (such as, blades, fins, etc.) separated by a gap using the processes described herein. In order to form a bridge between unconnected ends (free ends) of the protrusions, the space between the protrusions may be filled with a first powder metal. The first powder metal may then be compacted to form a first material having a first surface between the free ends of the protrusions. In some embodiments, a material removal process (such as machining or chemical etching) may be performed to remove material from the first surface and form a continuous surface connecting the free ends of the protrusions. The material removal process may be tailored to conform the shape of this continuous surface to a desired shape of the bridge. The material removal process may also expose the free ends of the protrusions. A second powder metal may then be deposited over the first surface and compacted to form a layer of second material over the first surface. The first material may then be removed by mechanical processes (air blasting, water blasting, ultrasonic vibrations, etc.) or chemical processes (such as leaching, etching, etc.) to form a bridge of the second material over the free ends of the protrusions.

It will be apparent to those skilled in the art that various modifications and variations can be made to the disclosed process of making a shrouded impeller. Other embodiments will be apparent to those skilled in the art from consideration of the specification and practice of the disclosed process of making a shrouded impeller. It is intended that the specification and examples be considered as exemplary only, with a true scope being indicated by the following claims and their equivalents.

What is claimed is:

1. A method of fabricating a shrouded impeller, comprising:
    providing an open faced impeller, the open faced impeller including a plurality of blades extending at least partially radially from a hub;
    performing a first powder metallurgical process to form a first material over at least part of the open faced impeller; and
    forming a shroud circumferentially disposed about the hub and connected to one of more of the blades, including performing a second powder metallurgical process to metallurgically bond the shroud to at least some of the blades.

2. The method of claim 1, wherein performing a first powder metallurgical process includes performing a hot isostatic pressing process to form the first material with a substantially continuous surface over the blades.

3. The method of claim 1, wherein performing the first powder metallurgical process includes placing a first can containing a first powder on the open faced impeller such that the first can covers the blades and the first powder at least partially fills spaces between the blades.

4. The method of claim 3, wherein performing the first powder metallurgical process further includes performing a hot isostatic pressing process to harden the first powder to form the first material.

5. The method of claim 4, wherein performing the first powder metallurgical process includes removing the first can after forming the first material.

6. The method of claim 4, further including machining an outer surface of the first material to form a continuous surface connecting tips of the blades after forming the first material.

7. The method of claim 6, wherein performing the second powder metallurgical process includes placing a second can containing a second powder over the first material and performing a second HIP process to harden the second powder over at least part of the continuous surface.

8. The method of claim 7, wherein performing the second powder metallurgical process includes removing the first material and the second can after performing the second HIP process.

9. The method of claim 6, wherein performing the second powder metallurgical process includes placing a second can containing a pre-fabricated shroud over the continuous surface and performing a second HIP process to metallurgically bond the shroud to the tips.

10. The method of claim 9, wherein performing the second powder metallurgical process includes removing the first material and the second can after performing the second HIP process.

11. The method of claim 1, further including removing at least a portion of the first material after performing the second powder metallurgical process.

12. The method of claim 11, wherein removing at least a portion of the first material includes removing at least a portion of the first material by a chemical process.

13. The method of claim 11, further including machining a surface of the shroud after performing the second powder metallurgical process.

14. A method of forming a bridge over a pair of blades comprising:
   obtaining a component having a pair of blades separated by a gap, the pair of blades being coupled at a first end and uncoupled at a second end opposite the first end;
   filling the gap between the pair of blades using a first powder;
   compacting the first powder to form a first material, the first material including a first surface in a gap between the pair of blades;
   depositing a second powder on the first surface;
   compacting the second powder to form a second material on the first surface, the second material forming a metallurgical bond with the second end of the pair of blades; and
   removing the first material to form the bridge of second material connecting the second end of the pair of blades.

15. The method of claim 14, wherein compacting the first powder includes performing a hot isostatic pressing process to harden the first powder to the first material.

16. The method of claim 14, wherein compacting the first powder further includes removing material from the first surface to expose at least a portion of the second end of the pair of blades.

17. The method of claim 14, wherein compacting the second powder includes performing a hot isostatic pressing process to harden the second powder to the second material.

18. The method of claim 14, further including machining the second material to a desired dimension of the bridge.

* * * * *